KENNETH W. GOEBEL
INVENTOR.

BY S. Tierney Jr
ATTORNEY

Jan. 18, 1955     K. W. GOEBEL     2,699,647
ADJUSTABLE NOZZLE FOR EXHAUST GAS

Filed June 5, 1951     2 Sheets-Sheet 2

KENNETH W. GOEBEL
*INVENTOR.*

BY *S. Tierney Jr*
*ATTORNEY*

United States Patent Office 2,699,647
Patented Jan. 18, 1955

2,699,647

ADJUSTABLE NOZZLE FOR EXHAUST GAS

Kenneth W. Goebel, San Diego, Calif., assignor to Rohr Aircraft Corporation, Chula Vista, Calif., a corporation of California Application June 5, 1951, Serial No. 230,030

4 Claims. (Cl. 60—35.6)

This invention relates to adjustable discharge nozzles and is particularly, although not necessarily, adapted for use in connection with the tailpipe of an aircraft jet engine.

It is an object of the invention to provide means for easily controlling and varying the area of the exhaust gas discharge opening of a jet engine tailpipe.

Another object is to provide a device of this character which is capable of adjustment to any desired intermediate setting between its large and small openings.

A further object is to provide means for readily controlling the exhaust gas discharge opening from a remote point convenient to the pilot.

Another object is to provide a control means for the discharge opening in which the operating parts are not subjected to the high heat of the exhaust but are kept at relatively low operating temperatures.

A still further object is to provide a device of this character which is substantially leakproof.

Another object is to provide for the variation of the exhaust gas discharge opening by the rotation of a single control member through which the gas passes.

Further objects will become apparent as the description proceeds. For a better understanding of the invention, reference is made to the accompanying drawings, in which.

Figure 1:
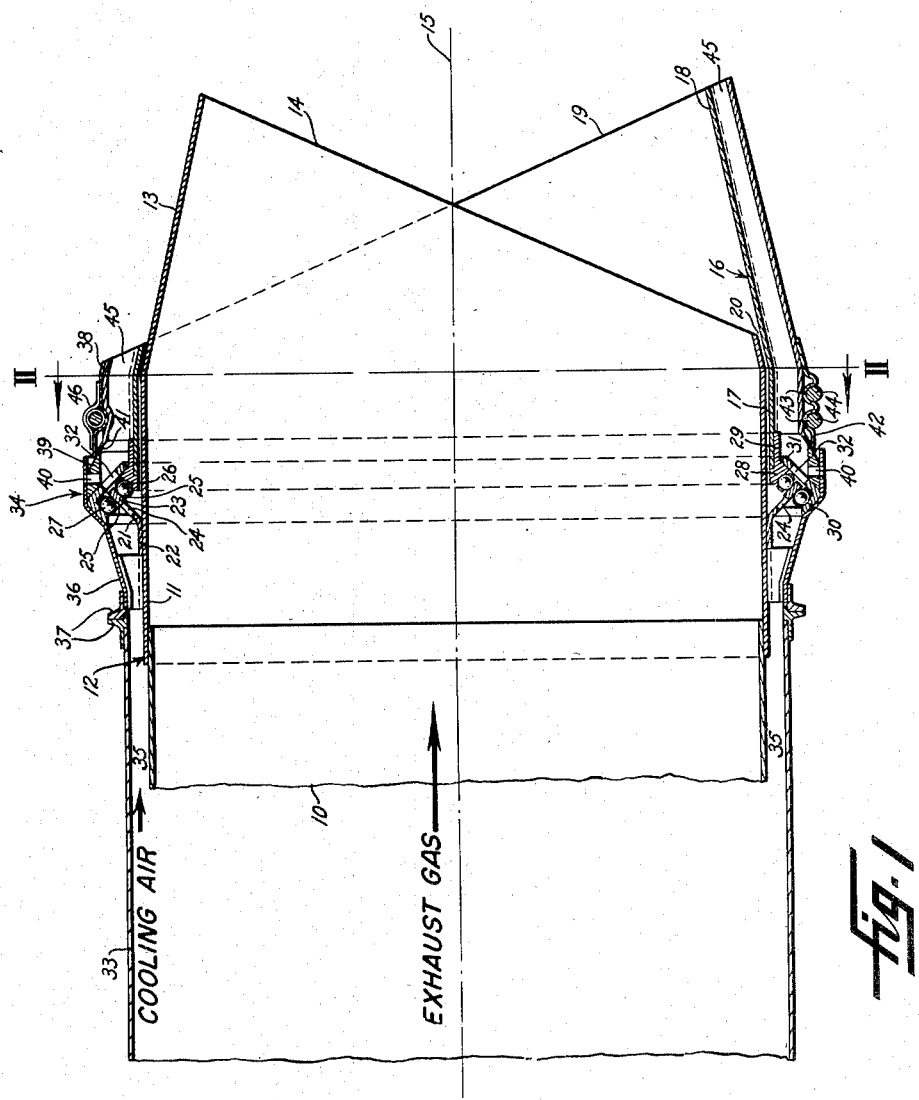
Figure 1 is a longitudinal sectional view of an adjustable nozzle construction for a jet engine embodying the invention.
Figure 2:
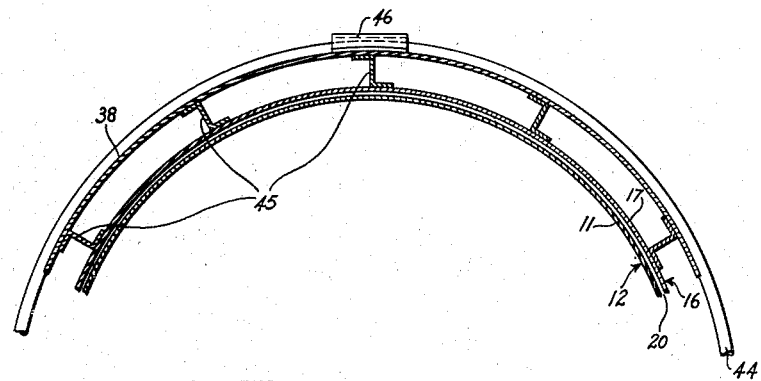
Figure 2 is a section on line 2—2 of Figure 1 showing a portion of the nozzle.

When a jet aircraft is taking off or climbing, it has a relatively low air speed, the efficiency of the jet engine being low at this time. Methods have been developed for increasing the performance characteristics of the basic jet engine for increased thrust at take off and climb and for extra bursts of speed during normal flight. Such methods for increasing jet engine thrust are called thrust boosters or thrust augmentors.

One of the more promising of these thrust augmentation methods involves the injection and burning of additional fuel in the tailpipe gases downstream of the turbine. The burning of additional fuel increases the temperature of the gases in the tailpipe with a corresponding increase in the volume of the gases, therefore, since optimum jet nozzle area is different with afterburning, a suitable method of varying the exit area is necessary. This invention provides an adjustable nozzle whereby the area of the issuing jet may be kept at any desired value between minimum and maximum.

In the nozzle illustrated, the exhaust gases of an airplane jet engine issue from a cylindrical tailpipe 10 to which is attached the cylindrical portion 11 of a tube 12 whose downstream end is formed as a hollow truncated inner cone 13 whose truncated end 14 has its axis disposed at an angle of 23½ degrees to the central axis 15 of the nozzle. By restricting the flow of the exhaust gas issuing from cone 13, the jet thrust and speed of the airplane may be controlled. It is a main purpose of the invention to provide an easy means for securing such control. A second tube 16 is mounted for rotation through an angle of 180 degrees or more about tube 12, tube 16 having a short cylindrical portion 17 surrounding tube portion 11 and a hollow truncated cone portion 18 whose truncated end 19 has its axis disposed at an angle of 23½ degrees to nozzle axis 15. Tubes 12 and 16 are spaced apart, as indicated at 20, by an amount sufficient to provide for variations in size due to manufacturing tolerances and those due to thermal expansion, so that no binding of the parts takes place.

The means for supporting outer tube 16 for free rotation comprises a collar 21 having a cylindrical portion 22 secured to tube 12, as by welding, and an annular portion 23 disposed at an angle of substantially 45 degrees to nozzle axis 15. Annulus 23 is provided at spaced apart points with a series of holes 24 to provide for the passage of cooling air. The smooth bearing faces 25 of member 23 provide trackway for sets of ball bearings 26 and 27. The balls 26 run in a raceway 28 in a collar 29 which is secured to end 17 of tube 16 and balls 27 run in a raceway 30 formed in a ring 31 which is carried by collar 29. Ring 31 is provided with a series of spaced apart holes 32 which permit cooling air to pass. It will be observed that the construction described assures the axes of tubes 12 and 16 remaining in alignment, irrespective of any changes in size of the parts in either axial or radial directions, due to changes in temperature. It will be understood, however, that tube 16 may be supported for rotation by any other type of supporting means.

Figure 3:
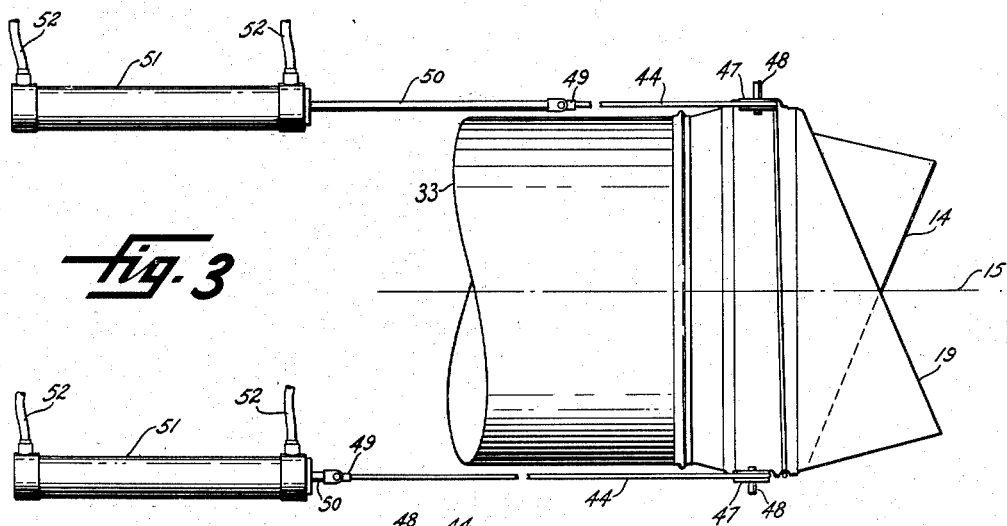
Figure 3 is a side view of the nozzle on a reduced scale, showing a schematic arrangement of the control linkage.
Figure 4:
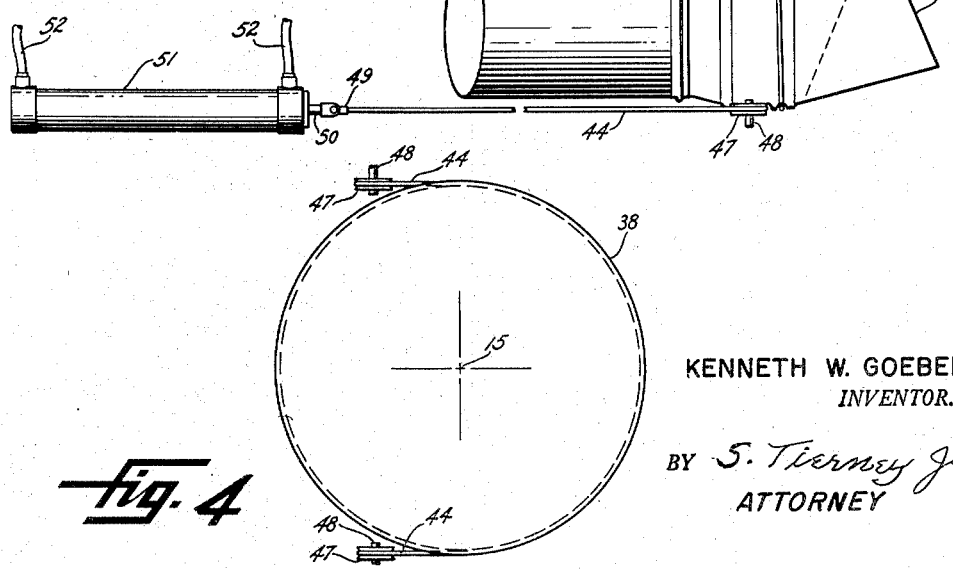
Figure 4 is a schematic end view showing a portion of the control linkage.

To cool tailpipe 10 and the nozzle, a cylindrical shroud 33 is provided about pipe 10 and a shroud 34 about the nozzle, cooling air being supplied to the space 35 between pipe 10 and shroud 33 from an air compressor, ram air intake or other available source on the aircraft. Shroud 34 is composed of a fixed shroud member 36 which is connected to shroud 33 by a pair of flanges 37, and a rotatable shroud member 38. Shroud 36 carries at its end a sealing ring 39 which is provided with a series of spaced apart holes 40 which also extend through shroud 36 to permit the passage of cooling air. Shroud 38 terminates in a flange portion 41 which bears against sealing ring 39 and at the end of 41 is attached a drive sleeve 42 having a spiral groove 43 to receive a drive cable 44. Shroud 38 is spaced from tube 16 and supported thereby by a set of spaced apart Z shaped supports 45 secured in place by welding or other securing means. Cable 44 is attached to shroud 38 by a clamp 46 and, after making about one and a half turns about sleeve 42, passes over a pair of pulleys 47 (see Figures 3 and 4) carried by shafts 48 supported for rotation in suitable bearings (not shown). The ends of cable 44 are attached at 49 to the ends of a pair of piston rods 50 operable by pistons within the hydraulic or air cylinders 51 to which fluid under pressure is supplied by supply lines 52. Wire cable 44 may extend forwardly in the aircraft any desired distance so that cylinders 51 may be located in a cool position away from the heat coming from tailpipe 10. It will be understood that the valve (not shown) controlling the fluid supply to lines 52 is located within easy reach of the pilot, thus providing a remote control means for adjusting the area of the nozzle orifice and the speed of the aircraft. It will be understood that instead of the cable and pulley construction shown, any other type of known drive means may be used for rotating the cone 18 to adjust the nozzle orifice.

With the parts in the position shown in Figure 1, the nozzle orifice is a minimum and the center of the issuing jet lies along nozzle axis 15. To secure a larger orifice opening, the pilot regulates his valve to draw upper piston rod 50 of Figure 3 in, which causes cable 44 to rotate tube 16 including cone 18 into a position defining a larger opening. Any desired setting of tube 16 may thus be secured until the maximum opening is obtained when the tube has been rotated through 180 degrees and its end face 19 lies in the plane of face 14 of fixed tube 12.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. An adjustable nozzle adapted to convey hot engine combustion gas comprising, in combination: a first stationary tube having a cylindrical portion terminating at its downstream end in a hollow truncated cone whose downstream edge is disposed in a plane inclined at an acute angle of A degrees to the axis of the cylindrical portion; a second tube arranged to restrict the orifice area of the nozzle and continually spaced outwardly of the first tube by a distance sufficient to prevent contact of the tubes when the tubes are at ambient air temperature and also when hot combustion gas is passing therethrough, said second tube having a cylindrical portion terminating at its downstream end in a hollow truncated cone whose downstream edge is disposed in a plane inclined at an angle of A degrees to the axis of the cylindrical portion thereof; a collar having a cylindrical portion secured to the cylindrical portion of the first tube and terminating in an annular wall inclined at an acute angle to the cylindrical portion of the collar; means connected to the cylindrical portion of the second tube and having slidable engagement with both faces of said annular wall for supporting said second tube with its cylindrical portion continually parallel to and spaced from the cylindrical portion of said first tube; and means connected to the outside of said second tube to rotate the second tube through an angle of at least 180 degrees.

2. An adjustable nozzle adapted to convey hot engine combustion gas comprising, in combination: a first stationary tube having a cylindrical portion terminating at its downstream end in a hollow truncated cone whose downstream edge is disposed in a plane inclined at an acute angle of A degrees to the axis of the cylindrical portion; a second tube arranged to restrict the orifice area of the nozzle and continually spaced outwardly of the first tube by a distance sufficient to prevent contact of the tubes when the tubes are at ambient air temperature and also when hot combustion gas is passing therethrough, said second tube having a cylindrical portion terminating at its downstream end in a hollow truncated cone whose downstream edge is disposed in a plane inclined at an angle of A degrees to the axis of the cylindrical portion thereof; an annular wall secured to the first tube and extending outwardly therefrom; means for supporting said second tube with its cylindrical portion continually parallel to and spaced from said cylindrical portion of the first tube, said supporting means comprising sets of balls movable along the opposite faces of said annular wall; and means connected to the outside of said second tube to rotate the second tube through an angle of the order of 180 degrees.

3. An adjustable nozzle adapted to convey hot engine combustion gas comprising, in combination: a fixed tube having a cylindrical portion terminating at its downstream end in an inwardly tapered portion; a second tube having a cylindrical portion surrounding and spaced from the cylindrical portion of the fixed tube, said second tube terminating at its downstream end in an inwardly tapered portion arranged to reduce the orifice area of the nozzle; means supporting said second tube for rotation about the axis of its cylindrical portion and with its cylindrical portion continually surrounding and spaced from the cylindrical portion of said fixed tube; and means for directing a current of coolant air along said tubes, said means comprising a fixed tubular shroud surrounding and spaced from the fixed tube; a rotatable tubular shroud having its upstream end in slidable contact with the downstream end of said fixed shroud; spaced apart members connecting said second tube and rotatable shroud; and means connected to the outside of said second shroud to rotate said shroud and second tube to vary the orifice area of the nozzle.

4. An adjustable nozzle as claimed in claim 3; in which the downstream end of said fixed shroud is provided interiorly with a circular metal sealing ring, the upstream end of said rotatable shroud being in slidable contact with the downstream end of said sealing ring.

References Cited in the file of this patent

UNITED STATES PATENTS

| Number | Name | Date |
|---|---|---|
| 865,406 | Linker | Sept. 10, 1907 |
| 1,042,448 | Kane | Oct. 29, 1912 |
| 2,281,620 | Rueger | May 5, 1942 |
| 2,481,330 | Neal | Sept. 6, 1949 |
| 2,590,272 | Robertson et al. | Mar. 25, 1952 |
| 2,603,060 | Brown | July 15, 1952 |